April 28, 1931. J. BETHUNE 1,803,293
POWER TRANSMISSION GEARING
Filed Sept. 3, 1929
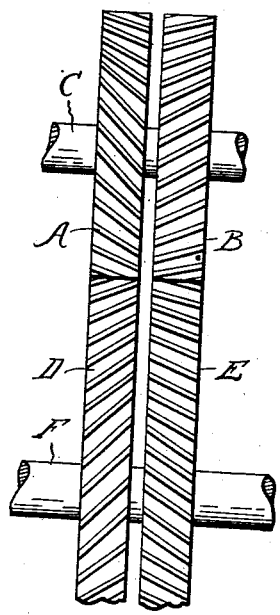
Fig. 1.
Fig. 2.
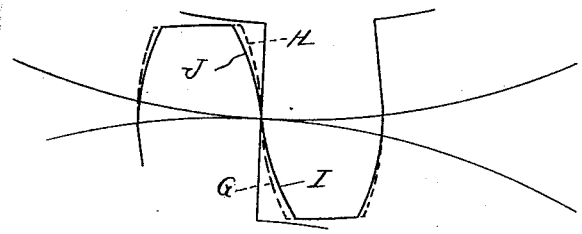
INVENTOR
John Bethune
BY Whittemore Hulbert
Whittemore & Belknap
ATTORNEYS Patented Apr. 28, 1931

1,803,293

UNITED STATES PATENT OFFICE

JOHN BETHUNE, OF ROCHESTER, NEW YORK, ASSIGNOR TO REO MOTOR CAR COMPANY, OF LANSING, MICHIGAN, A CORPORATION OF MICHIGAN

POWER TRANSMISSION GEARING

Application filed September 3, 1929. Serial No. 390,032.

The invention relates to power transmission gearing and more particularly to that type in which the power is transmitted through a plurality of loaded gear trains having noise reducing differential characteristics. The present invention relates to a particular construction of this type, viz: one in which there are differential tooth contours or profiles in the gears of the respective trains. To this end the invention consists in the construction as hereinafter set forth.

In the drawings:

Figure 1 is a side elevation of a gearing embodying my invention;

Figure 2 is an enlarged side elevation illustrating the different contours of the gears in the two trains.

It is well known in the gear art that where gears are running at a relatively high peripheral speed there is developed a sound or tone which rises in pitch as the speed is increased. It is also a fact that gears of different characteristics such as differences in circular pitch or in angle of teeth have individual tone producing qualities. I have discovered that where the power is transmitted through a plurality of gear trains having differential characteristics the sound produced is lessened, probably through interference between vibrations of different frequencies having a neutralizing effect on each other. Whether or not this is the true theory, it is a demonstrated fact that with such constructions noise production is lessened.

With the particular type of construction forming the subject matter of the present application the difference in characteristics of the two trains is due to a difference in tooth profile, such for instance as the forming of the teeth in one train as true involute curves and the teeth of the other train as modified involute curves of some other type of curve such as the cycloid.

As shown in Figure 1, A and B are two gears mounted on the same shaft C and D and E are the respective mating gears for the gears A and B mounted on a shaft F. The two trains are of equal ratio and the teeth are of the same circular pitch, but the tooth profile of the gears A and D differs from that of the gears B and E. Thus as shown in Figure 2 the teeth G and H of the gears A and D are in profile true involute curves while the teeth I and J of the gears B and E are in profile cycloidal curves. Thus in operation both trains are loaded and the power is transmitted partly through one and partly through the other. However, the difference in tooth contour will produce different vibration periods having a tendency to neutralize each other and to reduce the total volume of sound produced.

What I claim as my invention is:

1. A power transmission gearing comprising a plurality of simultaneously loaded equal ratio gear trains, the teeth of the two trains having their profiles formed by curves of different types.

2. The combination with a rotary drive member and a rotary driven member, of a gear train therebetween having a plurality of equal ratio simultaneously loaded gear train portions between said members, said gear train portions having differential tooth contours.

3. The combination with a rotary drive member, of a rotary driven member, of a gear train therebetween having a plurality of equal ratio simultaneously loaded gear train portions, the teeth of the two gear train portions having differential tooth profiles.

4. The combination with a rotary drive member and a rotary driven member, of a gear train therebetween having a plurality of equal ratio simultaneously loaded gear train portions between said members, the teeth in one of said gear train portions having involute contour and the teeth of the other of said gear train portions having modified involute contour.

5. The combination with a rotary drive member and a rotary driven member, of a gear train therebetween having a plurality of equal ratio simultaneously loaded gear train portions between said members, the teeth in one of said gear train portions having involute contour and the teeth of the other of said gear train portions having cycloidal contour.

6. A herringbone gear having the oppositely inclined teeth of different tooth profiles.

In testimony whereof I affix my signature.

JOHN BETHUNE.